N. G. GOREAU.
CONTROLLER FOR WATER HEATERS, &c.
APPLICATION FILED MAR. 31, 1911.
1,114,877.
Patented Oct. 27, 1914.
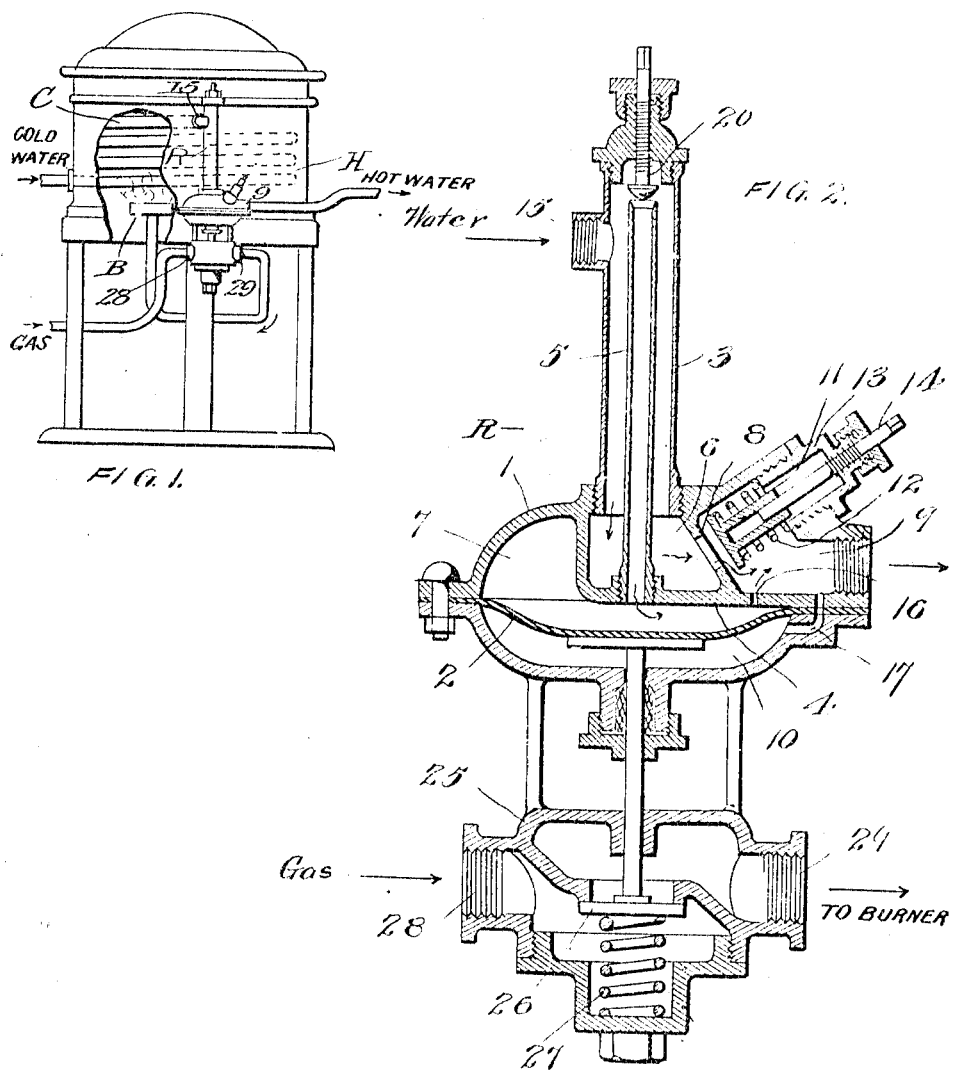

UNITED STATES PATENT OFFICE.

NELSON G. GOREAU, OF NEW ORLEANS, LOUISIANA.

CONTROLLER FOR WATER-HEATERS, &c.

1,114,877. Specification of Letters Patent. Patented Oct. 27, 1914.

Application filed March 31, 1911. Serial No. 618,199.

*To all whom it may concern:*

Be it known that I, NELSON G. GOREAU, a citizen of the United States, residing at New Orleans, in the parish of Orleans and State of Louisiana, have invented a new and useful Controller for Water-Heaters, &c., of which the following is a specification.

My invention relates to an automatic gas controller designed with especial reference to use in an automatic water heater, but it is to be understood that the invention may be applied to other uses.

A principal object of the invention is to provide a controller of simple and durable construction which will give a close regulation of temperature of the heated water.

More particularly, an object of the invention is to provide a thermostat which effects an equalization of pressures in two water chambers, this equalization being accomplished either at the inlet or outlet of said chambers.

The invention also provides means for crating differential pressures in the different chambers to overcome the tension of a regulating spring by means of which the gas valve is operated.

I will now describe an exemplifying construction in which the invention is embodied. This is the best form that I have up to the present time devised but it should be understood that the invention is capable of embodiment in other forms.

In the drawing, Figure 1 is an outline sketch in elevation of a convenient form of water heater with my controller applied to it; and Fig. 2 is a vertical section of the controller.

In Fig. 1 H designates a casing or housing for a water heater containing any suitable water-heating container, such as the coil C. R designates the controller as a whole. This is conveniently located outside the casing, as shown. B is a burner, one or more of which may be provided as desired.

Referring now to Fig. 2, diaphragm casing 1 contains diaphragm 2. Upon the casing is secured a pipe 3 which forms the outer portion of the thermostat and may be identified conveniently as a "shell." The diaphragm casing has a horizontal partition 4 and upon this is fastened a tube 5 extending up within the shell. This tube forms the inner portion of the thermostat and may be identified simply as a "tube." Tube 5 is made of material having a greater capacity for expansion than shell 3, so that when water passing through the shell is heated the tube 5 expands faster than the shell, and when the water temperature finally reaches a determined point the valve opening formed at the upper end of the tube is gradually closed and finally completely closed to cut off the supply of water to chamber 7. The shell 3 communicates with the chamber 6 in the casing and the tube with chamber 7 above the diaphragm. An angular partition 8 separates chamber 6 from the discharge chamber 9 to which the service pipe is to be connected. There is a passage in this partition normally closed by the pressure regulating valve 11 which is urged to seat by spring 12. This spring may be adjusted by turning the bushing 13 and the extent of opening of the valve may be regulated by means of the threaded stem 14. Below the diaphragm is another chamber 10. Water from the heater is admitted near the upper end of the shell at 15. Chamber 10 connects with discharge chamber 9 at a point beyond the regulating valve through a small passage 16 and chamber 10 connects with the discharge chamber by a passage 17. Communication between the upper end of tube 5 and the water supply in shell 3 is regulated by an adjustable valve 20. Secured below the diaphragm casing is a gas valve casing 25 containing gas valve 26 which is urged to close by spring 27. Gas enters at 28 and passes at 29 to the burner.

Normally, when water is not being used, regulating valve 11 is held closed by its spring; thermostat valve 20 is open since the thermostat is cold; the gas valve is closed by its spring 27. If there is a demand for hot water a valve in the service pipe is opened, reducing pressure in the service line and in discharge chamber 9. The constant pressure at the supply connection 15 and in chamber 6 now overcomes the effect of spring 12 and the regulator opens and water flows to the service pipe through opening 8. At the same time water passes the thermostat valve 20 and going through tube 5 supplies pressure to chamber 7, thus depressing the diaphragm and opening the gas valve 26. Gas now flows to the burners and being ignited, usually by a pilot light, water in the heating coil is heated. Spring 12 maintains a pressure in chambers 6 and 7 greater than that in the discharge chamber 9 and in the lower chamber 10 below the diaphragm. A small amount of water passes from chamber 7 through the port 16 to the discharge chamber. The hot water now flowing through the thermostat causes tube 5 to lengthen in relation to shell 3 (suitable materials being employed for this purpose) and at the proper temperature the thermostat valve 20 closes. The water flow still maintains full pressure in chamber 6 but leakage from chamber 7 continues and there being no supply, pressure in chamber 7 is reduced until spring 27 closes the gas valve and raises the diaphragm. Heat under the coil is thus diminished; water temperature falls somewhat; thermostat valve 20 opens somewhat; pressure is restored to chamber 7; the gas valve is again opened and so on.

The desired temperature is regulated by valve 20 and regulating valve 11 is regulated as to spring pressure and extent of opening in accordance with variations in water pressure or to vary the action of the device due to water pressure, as desired.

It should be noticed that water flows from the inlet to the discharge side of the apparatus past resistance member 11 and the flow can be varied by adjusting screw 14, thus regulating the opening of the valve. At the same time a constant spring pressure is opposed to the flow to insure the effectiveness of the pressure motor. This spring pressure may also be adjusted by means of nut 13. There is also a second passageway or by-pass leading around the resistance member. This consists of tube 5 communicating with chamber 7 and port 16 leading from chamber 7 to the discharge pipe 9. Temperature regulation is effected by valve 20. This governs the flow of water into the by-pass, and, of course, the thermostat being subjected to the temperature of water coming from the heater, automatically effects temperature regulation in connection with valve 20.

I claim:

1. In an automatic water heater, the combination of a gas burner, a gas valve, a pressure motor for operating said valve, said motor being provided with an exhaust port, a passageway between the hot water supply and said motor, a thermostat for governing said passageway and a resistance member situated in the hot water supply on the discharge side of said motor, said thermostat varying the flow of water to said motor and thereby varying the pressure therein.

2. In an automatic water heater, the combination of a gas burner, a gas valve, a pressure motor for operating said valve, a discharge passage leading to a service line, a resistance member in the hot water line on the discharge side of the motor, a passageway around said resistance member connecting the hot water supply with the discharge passage and communicating with the pressure motor, and a thermostat controlling said passageway.

3. In an automatic water heater, the combination of a water service passage, a burner, a gas valve, a pressure motor operating said gas valve, a resistance member in said water passage, a by-pass around said resistance member communicating with said pressure motor, and a thermostat controlling said by-pass.

4. In an automatic water heater, the combination of a water-service passage, a burner, a gas valve, a pressure motor operating said gas valve, a resistance member in said water passage, a by-pass around said resistance member communicating with said pressure motor, a thermostat controlling said by-pass, and means for adjusting the resistance member.

5. In an automatic water heater, the combination of a water-service passage, a burner, a gas valve, a pressure motor operating said gas valve, a resistance member in said passage, a by-pass around said resistance member communicating with said pressure motor, and means for adjusting the thermostat to vary the temperature regulation.

6. In an automatic water heater, the combination of a water heating receptacle, a gas burner, a gas valve, a pressure motor operating said valve, a water supply conduit leading to the motor, a discharge conduit leading away from the motor, means for applying resistance to water flow, thereby creating different pressures in said conduits for actuating the motor, a passageway connecting said conduits, and a thermostat communicating with and controlling said passageway for governing the action of the motor.

7. In an automatic water heater or the like, the combination of a water heating receptacle, a burner, a fuel supply valve, a pressure operated motor governing the fuel valve, a water supply conduit leading to the motor, an exhaust leading to the discharge line, means for applying constant resistance to the water flowing from the supply conduit to the discharge line, means for limiting the flow of water past said resistance, a by-pass around said flow limiting means and resistance, and a thermostat controlling the flow of water through said by-pass.

8. In an automatic water heater, the combination of a water heating conduit, a flow resisting member suitably located in the conduit, by-pass for said conduit about said resisting member, a fuel supply valve, a pressure operated motor governing the fuel valve, said motor having a reciprocating member dividing the motor into two pressure chambers, one of said chambers having communication with said conduit, the other having communication with said by-pass, and thermostatic means governed by the heated water adapted to control said by-pass whereby the effective pressures in said motor are jointly controlled by the flow and temperature of the water being discharged from said conduit.

NELSON G. GOREAU.

Witnesses:
 BYRON L. POND,
 ANDREW H. WILSON.